Sept. 29, 1964 C. H. JOLLY 3,151,263
LAMP WITH RESETTABLE INDICATOR
Filed Jan. 30, 1961 2 Sheets-Sheet 1

INVENTOR.
CARL H. JOLLY
BY
*Lu R. Schermerhorn*
ATTORNEY

Sept. 29, 1964           C. H. JOLLY           3,151,263
LAMP WITH RESETTABLE INDICATOR
Filed Jan. 30, 1961           2 Sheets-Sheet 2
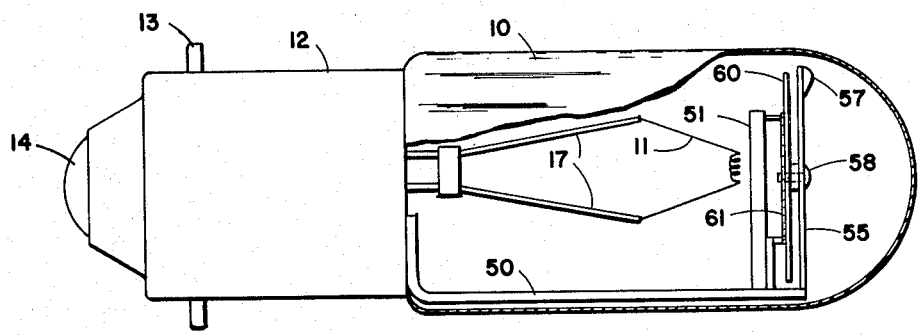
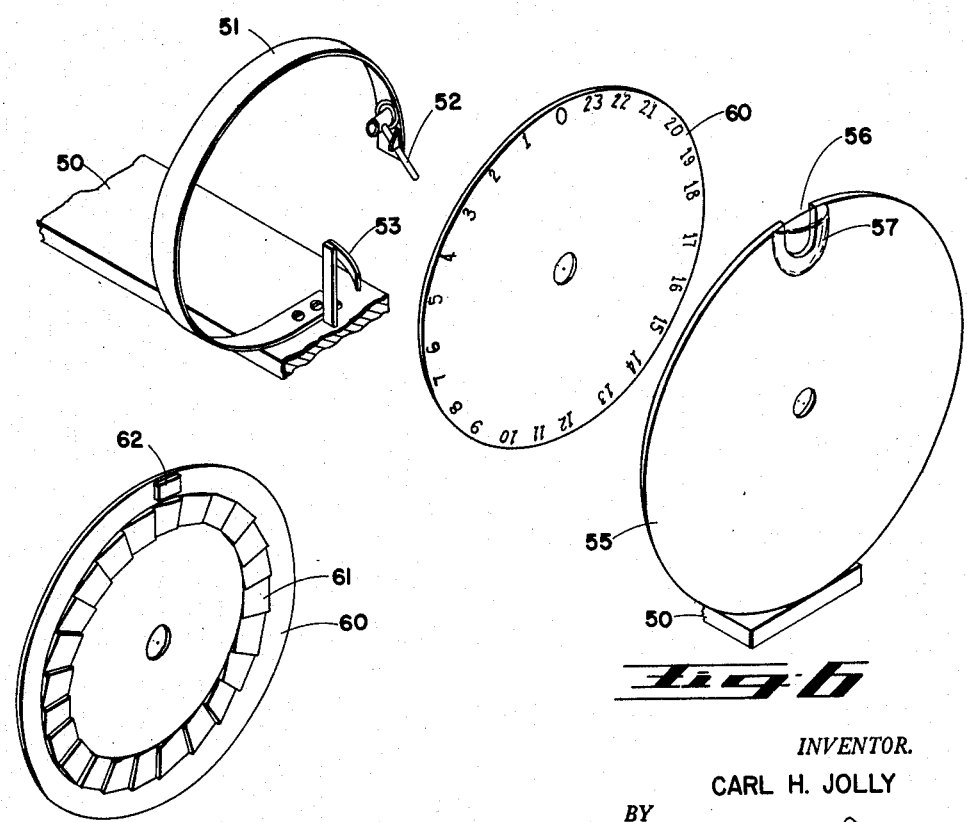
INVENTOR.
CARL H. JOLLY
BY
ATTORNEY

United States Patent Office 3,151,263
Patented Sept. 29, 1964

3,151,263
LAMP WITH RESETTABLE INDICATOR
Carl H. Jolly, 15734 SE. Powell Blvd.,
Portland 36, Oreg.
Filed Jan. 30, 1961, Ser. No. 85,678
12 Claims. (Cl. 313—109.5)

This invention relates to an indicator for electric circuits and particularly signal lamps, which will provide a continuing indication after the circuit or lamp has been deenergized and which may be reset for repeated use.

Electric signal lamps are commonly used to provide a visual indication of the energization or deenergization of a circuit such as a signal circuit for alarm or warning purposes. These circuits and indicator lamps are frequently used in systems where a lamp signal may not be observed before it is extinguished. This situation may arise where there are a multiplicity of signals of short duration occurring at the same time or where the signal occures in the absence of any observer. In such cases it has been the practice to install some type of annunciator board to provide a continuing indication after the signals have ceased.

There are numerous sapplications, however, where the extensive wiring and instrumentation of a central annunciator board are not practical or desirable. It is often desired to provide a continuing indication in the indicator lamp itself. For example, in a fire alarm system for a building, the alarm may be set off by any one of a number of sensitive fire or smoke detectors distributed throughout the building. It has been proposed to provide each detector with an indicator lamp so that in case of a false alarm from malfunctioning of a particular detector, the faulty detector may be located and replaced at once without the necessity of testing all the detectors in the building to determine the source of the false alarm.

Such an alarm system, however, usually includes one or more loud bells. When a false alarm accurs the whole system is usually deenergized as quickly as possible in order to stop the noise of the bells, and then any signal lamps in the system are extinguished, making it impossible to determine which detector is responsible for the alarm. A continuing indicator in each detector would reveal immediately which detector was a fault. There are numerous other types of systems where a signal may be only momentary, and it would be desirable to have a continuing indication in the signal device itself, such as an indicator lamp, without all the auxiliary wiring and equipment necessary for a conventional annunciator board. There are also other situations where an unattended signnal lamp may operate repeatedly without observation, and it may be desired to know how many times the signal has operated.

Also, in connection with fire alarm and other systems which normally function infrequently, there exists the problem of maintaining all the operating mechanism in good working order. When exposed to moisture and dust laden air, and in some cases also to corrosive fumes and gases, conventional mechanical devices tend to stick and corode and become inoperative in the course of time. Periodic testing may be resorted to, but even there still exists the problem of effective maintenance. Both testing and maintenance tend to be neglected with respect to any equipment which is seldom used and not essential to the daily functioning of the enterprise with which the equipment is associated.

The general object of the present invention is, therefore to provide a continuing resettable indicator which will overcome the objections and disadvantages of conventional equipment for this purpose.

Other objects are to provide an indicator of the type described which will remain in operative condition for a long period of time without attention, to provide an indicator in which the operating mechanism is sealed from the atmosphere, to provide a thermally actuated indicator within the glass envelope of an electric lamp bulb, to provide magnetic resetting means for a mechanical indicator enclosed in a lamp bulb, and to provide an indicator of the type described having a counter to show the number of times a signal circuit has operated.

The present indicator is actuated by a bimetallic strip mounted within the glass envelope of a signal lamp and responsive to heat from the filament of the lamp. In one form of the device a signal flag is brought into view by the movement of the bimetallic strip from the heat of the lamp filament when the latter is energized. A latch device holds the signal flag in its actuated position after the filament and bimetallic strip have cooled, whereby the signal contines indefinitely until the device is reset. By making the latch of magnetic material positioned adjacent to the end of the envelope of the lamp, the latch may be released by merely bringing a permanent magnet into proximity to the end of the lamp.

In another form of the device a numbered indicating disc is arranged to be rotated by a pawl on the movable end of the bimetallic strip. Each time the lamp filament is energized the disc is rotated to the next number, whereby there is provided an indication of the number of energizations. A piece of iron mounted on the periphery of the numbered disc permits the disc to be rotated to its starting position by swinging a permanent magnet around the envelope of the lamp in proximity to the periphery of the disc.

Thus the present indicators are sealed from the atmosphere to avoid deterioration and malfunctioning of the operating mechanism in any kind of adverse environment. Conventional annunciator boards with their elaborate instrumentation and extensive wiring are eliminated, and the continuing indication is provided directly in the indicator lamp itself.

The invention will be better understood and additional objects and advantages will be appreciated from the following description of two preferred embodiments illustrated in the accompanying drawings. Various changes may be made however, in the construction and arrangement of parts and certain features may be used without others, all such modifications within the scope of the appended claims being included in the invention.

In the drawings:

FIGURE 5 is a view similar to FIGURE 1 showing a modification having a counter disc;

FIGURE 6 is an enlarged fragmentary exploded view of the indicating device in FIGURE 5; and FIGURE 7 is a perspective view of the back side of the counter disc shown in FIGURES 5 and 6.

Figure 1:
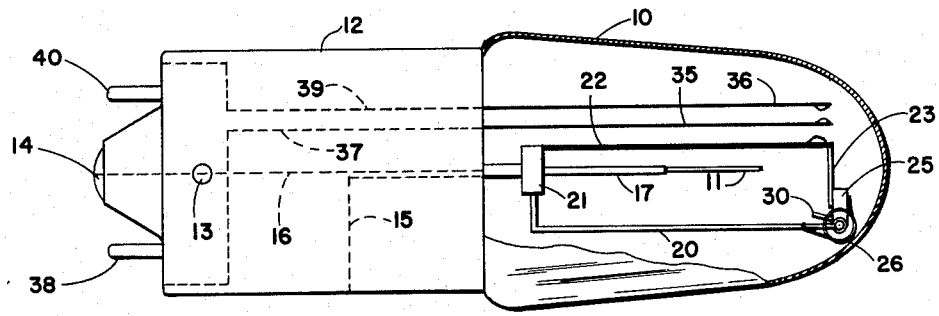
FIGURE 1 is a side elevation view of an indicator lamp embodying one form of the present invention with a portion of the glass envelope broken away showing the signal flag in non-indicating position.

In both embodiments of the device the present indicator is mounted within the hermetically sealed glass envelope 10 of a conventional indicator lamp having an incandescent filament 11. The envelope 10 is supported by a cylindrical metal base 12 having bayonet pins 13 and an insulated center contact 14 to fit a conventional low voltage electric socket. The filament 11 is energized by a wire 15 connected with the metal base 12 and a wire 16 connected with contact 14 in the usual way. Filament 11 is carried by the ends of a pair of supporting wires 17 mounted in a glass support in the lamp base.

Figure 2:
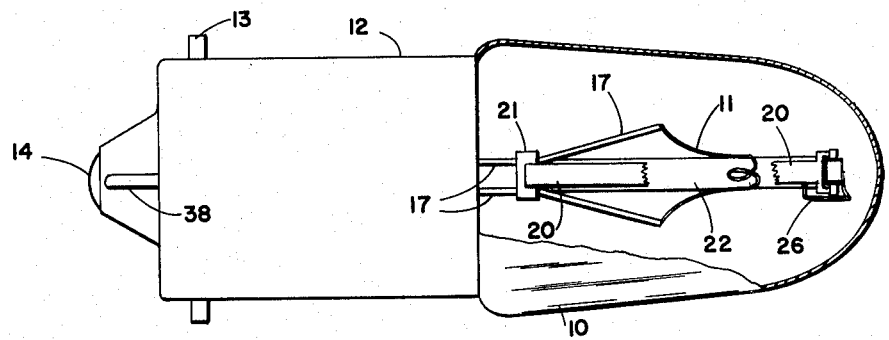
FIGURE 2 is a bottom plan view of the device in FIGURE 1.
Figure 3:
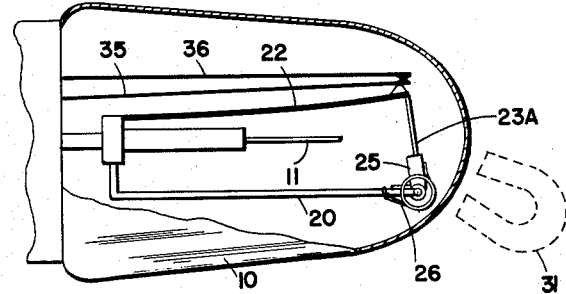
FIGURE 3 is a view similar to FIGURE 1 showing the signal flag latched in indicating position.

The continuing resettable indicator in FIGURES 1 to 4 includes an L-shaped supporting arm 20 having its inner end embedded in one side of a glass bead 21 bridging the filament support wires 17. The opposite side of glass bead 21 provides rigid support for the inner end of a straight bimetallic thermostatic strip 22 overlying the lamp filament 11 so as to receive heat therefrom. Rigidly mounted on the free outer end of bimetallic strip 22 is a perpendicular signal flag 23, the lower end portion 23a of which is painted with a distinguishing color such as red, as indicated in FIGURE 3.

The outer end of support arm 20 adjacent to the end of envelope 10 is bifurcated and equipped with a transverse pin 24 providing pivotal mounting for an upstanding masking and latching plate 25 made of magnetic material such as soft iron. Masking plate 25 is normally biased toward the flag 23 by a fine hair spring 26 having one end 27 anchored to the arm 20 and another end 28 bearing against the outside face of plate 25. When filament 11 is not energized, the bimetallic strip 22 remains straight at room temperature with the lower red painted end of flag 23 concealed behind mask plate 25 as shown in FIGURE 1.

Figure 4:
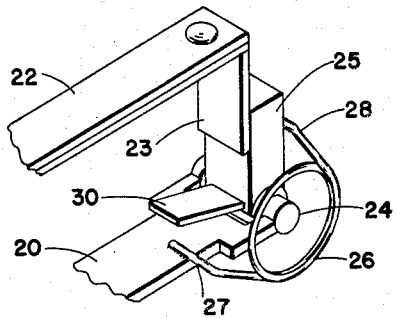
FIGURE 4 is an enlarged fragmentary perspective view of the latching device in FIGURES 1 to 3.

When the lamp filament is energized, its heat causes bimetallic strip 22 to bend upward, raising the lower end of flag 23 slightly above the upper end of mask plate 25 so that the red indicating portion 23a on the lower end of the flag becomes visible from the end of the lamp. Spring 26 then rotates mask plate 25 counterclockwise a slight amount until stop 30 on the mask plate engages arm 20. FIGURE 4 shows the position of the parts as the bimetallic strip starts to bend upward, before the lower end of flag 23 has cleared the upper end of mask plate 25. After flag 23 has cleared the upper end of mask plate 25, the latter rotates counterclockwise to its FIGURE 3 position. This places the broad upper end of mask plate 25 directly under the lower end of flag 23 and spaced slightly below the end of the flag. Any signal in the filament 11 of sufficient duration to heat the bimetallic strip will thus bring the parts into latching position.

When lamp filament 11 is deenergized, the lower end of flag 23 cannot drop behind mask plate 25 but rests on top of the end of the mask plate as shown in FIGURE 3, whereby the flag is latched in viewing position to provide a continuing indication that the lamp filament has been energized. After the signal flag has been observed, the device may be reset by merely bringing a magnet 31 into proximity to the end of the envelope 10 to pull the mask plate 25 out from under the end of the flag 23. The flag thereupon snaps down into its original position behind the mask plate as shown in FIGURE 1, the cooled bimetallic strip 22 operating as a spring and tending to resume its straight condition.

The device shown in FIGURES 1 to 3 may, if desired, also include a relay circuit to be closed by the thermostat 22. For this purpose a pair of spring arms 35 and 36 are mounted in the glass base of the envelope 10 to extend parallel with the bimetallic strip 22 along its side opposite the filament 11. Spring arm 35 is connected through a wire 37 to an insulated contact pin 38, and spring arm 36 is connected through a wire 39 to an insulated contact pin 40. It is understood, of course, that when the contact pins 38 and 40 are provided, the lamp socket is equipped with appropriate mating contacts to complete the relay circuit. This circuit is normally open when the bimetallic strip 22 is unheated, but when strip 22 bends upward from heating it presses the spring arm 35 against the spring arm 36 to close the circuit as shown in FIGURE 3. By causing the bimetallic strip to bear against the remote spring arm 36 instead of the near spring arm 35, these spring arms can be arranged to open a normally closed circuit instead of closing a normally open circuit, by the bending of the bimetallic strip.

Also, it will be appreciated that the device may be arranged so that the flag 23 will provide an open circuit signal rather than a closed circuit signal with respect to the energization of the filament 11. All that is necessary is to reverse the positions of the two different metals in the composite strip 22 so that this strip will assume its FIGURE 3 position when cold but will maintain its FIGURE 1 position when heated by a normally closed filament circuit.

The modification shown in FIGURES 5–7 will record the number of a plurality of operations since it was last reset. The indicating mechanism in this device is mounted on the outer end of an L-shaped supporting arm 50 which has an angular inner end mounted to the base of the glass envelope 10. One end of an arcuate bimetallic strip 51 is mounted on the arm 50 so that the strip approximately surrounds and receives heat from the incandescent lamp filament 11. The free end of strip 51 carries a spring pawl 52 while mounted on the arm 50 adjacent to the fixed end of strip 51 is a spring dog 53.

Secured on the outer end of support arm 50 is a masking disc 55 having a window opening 56 in its periphery equipped with a magnifying lens 57. The center of masking disc 55 carries a pin 58 for a counter disc 60 bearing numbers around its periphery which turn into view through window 56. The back side of counter disc 60 is equipped with a ratchet gear 61 which may comprise simply projections or tongues struck out from the material of the disc. Ratchet gear 61 is engaged by pawl 52 and dog 53. The discs 55 and 60 are preferably made of a non-magnetic material such as brass or aluminum. Attached to counter disc 60 adjacent to its periphery is a small piece of magnetic material 62 such as soft iron. The disc 60 is coaxial with the circular envelope 10 with the periphery of the disc and the iron armature 62 spaced closely within the inside surface surface of the envelope.

When the filament 11 is energized, it heats bimetal strip 51 causing the free end with the pawl 52 to move downward and rotate the counter disc 60 from one number to the next as viewed in window 56. Magnifying lens 57 facilitates easy reading of the numbers at a distance in a small lamp. When the filament 11 is deenergized, dog 53 holds the counter disc against reverse rotation while the pawl 52 retracts with the upward cooling movement of the free end of bimetal strip 51.

The characteristics of bimetal strip 51 are such that the range of movement of the free end of the strip during heating and cooling slightly exceeds the distance between consecutive number marks on the counter disc. Then by providing a number of teeth on ratchet gear 61 equal to the total number of indicia on the counter disc, the dog 53 may be adjusted to index the counter disc so that a number thereon will register with the window opening 56 after each actuation of the device. In other words, there will be a slight overrun of the counter disc during the heating movement of the bimetal strip followed by a slight retrograde movement of the counter disc during the cooling movement of the bimetal strip as pawl 52 turns the counter disc backward until a tooth engages the dog 53. The overrun insures that there will be ample travel to engage a new tooth with the holding dog in each actuation. The counter disc is thus capable of recording a number of actuations equal to the number of teeth in gear 61.

The counter disc is reset by rotating it clockwise forward to zero as viewed in FIGURE 6. This is accomplished by swinging a magnet in an arc around the outside of envelope 10 until the magnet picks up the soft iron armature 62 in its field, causing the counter disc to drag around with the magnet. During this reset movement the teeth of gear 61 ratchet freely over pawl 52 and dog 53.

In both embodiments the continuing indicators are relatively light and delicate and respond to forces of small magnitude without imposing any additional load on the electrical system. The thermostatic strip provides a motor element which is operated by waste heat energy whereby it may be said that the device operates without power consumption from the signal circuit. The forces involved are not large enough to overcome the sticking effects of dust and moisture in the atmosphere over a long period of time but when the entire mechanism is sealed in the glass envelope of the indicator lamp the mechanism is entirely free of all such deleterious substances and has a dependable useful life without servicing as long as the expected life of the lamp filament which is all that is required. Thus, the indicating mechanisms are completely dependable and trouble free as long as the lamp filament continues to operate. The devices are operable in any position of the lamp, being independent of the direction of gravity. Further, the devices are compact and inexpensive and are designed for incorporation in conventional lamp bulbs with a minimum modification of standardized structure.

Having now described my invention and in what manner the same may be used, what I claim as new and desire to protect by Letters Patent is:

1. An indicator lamp having a sealed envelope and circuit means for energizing the lamp, an indicator in said envelope, a motor element actuated by the energization condition of the lamp to move said indicator, means for holding said indicator in motor actuated position after the energization condition of the lamp has been changed, and magnetic reset means for said indicator.

2. An indicator lamp as defined in claim 1, said motor element tending to move in one direction when the lamp is energized and in the opposite direction when the lamp is deenergized, and said reset means comprising a magnetic element within said envelope operable on said indicator and adapted to be moved by a magnet outside of said envelope.

3. An indicator lamp as defined in claim 2, said motor element comprising a thermostat.

4. An indicator lamp as defined in claim 3, said circuit means including a lamp filament adjacent to said thermostat.

5. An indicator lamp as defined in claim 4, said movable indicator being mounted on said thermostat, and said reset means comprising a magnetic latch engageable with said indicator.

6. An indicator lamp as defined in claim 4, said movable indicator comprising a rotary member and said reset means comprising a magnetic armature on said member.

7. An indicator lamp comprising a sealed envelope having circuit means for energizing the lamp, an indicator in said envelope movable in response to the energization condition of the lamp, means to hold said indicator in actuated position after the energization condition of the lamp has changed, and a magnetic element in said envelope operable by a magnet outside of said envelope to reset the indicator.

8. An indicator lamp comprising a sealed envelope containing a lamp filament, a bimetal thermostatic strip adjacent to said filament, an indicator in said envelope actuated by said bimetal strip, means to hold said indicator in actuated position when said bimetal strip tends to reverse its movement, and a magnetic element in said envelope operable by a magnet outside of said envelope to reset the indicator.

9. In an indicator lamp having a sealed envelope containing a lamp filament, a support adapted for mounting in said envelope, a bimetal strip mounted at one end on said support, an indicator actuated by movement of the opposite end of said bimetal strip, means to hold said indicator in actuated position when said bimetal strip tends to reverse its movement, and a magnetic element for resetting said indicator.

10. In an indicator lamp having a lamp filament in a sealed envelope, a movable indicator in said envelope, a mask adapted to cover at least a portion of said indicator, a thermostatic element in said envelope responsive to changing temperature of said filament to move said indicator relative to said mask, means to hold said indicator in actuated position upon temperature reversal of said filament, and a magnetic element in said envelope operable by a magnet outside of said envelope to reset said indicator.

11. In an indicator lamp having a sealed envelope containing a lamp filament on a pair of supporting wires, an insulating bead on said wires, a thermostatic strip adjacent to said filament mounted at one end on said bead, a supporting arm mounted at one end on said bead, an indicator on the opposite end of said thermostatic strip, and a magnetic latch for said indicator pivotally mounted on the opposite end of said arm.

12. In an indicator lamp having a sealed envelope containing a lamp filament, a supporting arm adapted for mounting at one end in the base of said envelope, an arcuate thermostatic strip mounted at one end on said arm adjacent said filament, a mask disc mounted on the other end of said arm, said disc containing a window equipped with a magnifying lens, a counter disc mounted for rotation on said mask disc behind said window, a magnetic element on the periphery of said counter disc, a ratchet gear on said counter disc, a pawl on the opposite end of said thermostatic strip for rotating said counter disc in one direction, and a dog on said arm to prevent reverse rotation of said counter disc.

References Cited in the file of this patent

UNITED STATES PATENTS

| | | |
|---|---|---|
| 1,874,182 | Gebhard | Aug. 30, 1932 |
| 2,490,145 | McGoffin | Dec. 6, 1949 |
| 2,609,465 | Goldsmith | Sept. 2, 1952 |
| 841,387 | De Forest | Jan. 15, 1907 |